United States Patent [19]

Charis et al.

[11] 4,436,400
[45] Mar. 13, 1984

[54] APPARATUS FOR POSITIVE VIGNETTING

[75] Inventors: Phillip S. Charis, 2631 Buenos Aires, Covina, Calif. 91724; Roy Sweeney, Pasadena, Calif.

[73] Assignee: Phillip Stewart Charis, Pasadena, Calif. ; a part interest

[21] Appl. No.: 326,859

[22] Filed: Dec. 3, 1981

[51] Int. Cl.³ .............................................. G03B 11/00
[52] U.S. Cl. .................................................. 354/296
[58] Field of Search ................. 354/295, 296, 77, 130, 354/131, 354; 352/47-49, 91; 355/125, 126

[56] References Cited

U.S. PATENT DOCUMENTS

| | | | |
|---|---|---|---|
| 2,556,307 | 6/1951 | Walker | 354/202 FF |
| 2,821,105 | 1/1958 | Walker | 354/296 X |
| 2,972,931 | 2/1961 | Roob | 354/296 X |
| 4,155,029 | 5/1979 | Yamaoka | 354/131 X |
| 4,204,761 | 5/1980 | Walker | 354/202 |

Primary Examiner—John Gonzales
Attorney, Agent, or Firm—Wagner & Bachand

[57] ABSTRACT

The apparatus of the present invention is for use with a subject and a camera, including a lens and a shutter, for positive vignetting comprising a means adjacent the camera lens for at least partially obstructing subject light received by the camera lens in regions of the camera lens to be positive vignetted, a means for providing auxiliary light to the region adjacent the camera lens, and a means for directing a pattern of the auxiliary light to the camera lens in the regions of the camera lens to be positive vignetted. The method of the present invention is for use with a subject and a camera including a lens for providing positive vignetting comprising the steps of partially obstructing subject light from the camera lens in a region of the camera lens to be positive vignetted, and, introducing auxiliary light to the region to be positive vignetted.

4 Claims, 11 Drawing Figures

APPARATUS FOR POSITIVE VIGNETTING

BACKGROUND OF THE INVENTION

The present invention relates to an apparatus and method of photographic vignetting and more particularly related to an apparatus and method of positive photographic vignetting.

Photographic vignetting is the process of interposing a vignetting member between the photographic subject and the camera lens to partially obstruct the light from the subject to cause the subject to gradually blend into a dark background on the finished photograph. This photographic vignetting, which the applicant terms negative vignetting, involves reduction only of the light received from the subject.

The classical vignetter is a partial mesh having a sawtooth edge which causes the blending effect. There are various devices which have been designed to implement negative vignetting. The most recent device known to the applicant can be found in U.S. Pat. No. 4,126,878 to Irving Steiner, issued Nov. 21, 1978. Here, a plurality of interfitting ring segments each filtering a different frequency of light are attached to a camera lens to modify the light coming from the subject in an artistic way. U.S. Pat. No. 3,774,992 is an older version of the Steiner concept which also deals with modifying the light from the subject.

In U.S. Pat. No. 4,124,859 to Warren Huber, issued Nov. 7, 1978, one of several vignetting members can be selectively mounted to a housing which in turn is mounted to a camera lens to modify the light coming from the subject in an artistic way. U.S. Pat. No. 4,107,716 issued Aug. 15, 1978 to Irving Pfefer discloses a mounting for vignetting members which is attached to a camera lens. Here, the vignetting members and filters can be mounted in front of the camera lens to modify the light received from the subject for artistic purposes.

The device in U.S. Pat. No. 3,527,151, issued Sept. 8, 1970 to William Harrison, is an optical filter intended to be attached to a camera lens and has a diffusing section which acts to modify the light received from the subject. The device in U.S. Pat. No. 1,682,127, issued July 26, 1927 to A. S. Howell, is an adjustable photographic vignetter adapted to be mounted to a camera lens. Different vignetting effects are had with this device by adjusting the vignetter into different positions so that the light from the subject can be differently modified as desired. The device disclosed in U.S. Pat. No. 1,137,975, issued May 4, 1915 to C. R. Howard, is a means for mounting a vignetter member to the front of a camera.

There remains a need for what the applicant calls positive vignetting. That is some method and apparatus for lighting an area of a finished photograph with a light in addition to or in place of the normal subject light so that exposure of the film in this area is greater than would it would have been with the subject lighting alone. Therefore, the light used to provide the vignetting reflections is from a source other than the subject. None of the art known to the applicant discloses positive vignetting.

SUMMARY OF THE INVENTION

The object of the present invention is to provide an apparatus and method of positive photographic vignetting. Positive vignetting involves the application of an auxiliary light to provide the lightening vignetting effect in the vignetting areas of a finished photograph. This auxiliary light may be of such intensity that subject light in the vignetting areas is not seen on the finished photograph or may be of such intensity as to blend subject light and auxiliary light in the vignetting areas of the finished photograph.

The apparatus of the present invention is for use with a camera for positive vignetting and comprises a means for providing auxiliary light to the region adjacent the camera lens, a means adjacent the camera lens for at least partially obstructing subject light received by the camera lens, and a means for directing a pattern of the auxiliary light, in addition to the subject light, to the camera lens. The obstructing and directing means may include a negative vignetter which reflects auxiliary light to the camera lens. This negative vignetter may be one of the numerous types available such as a sawtooth or an optical diffuser negative vignetter.

The means for providing auxiliary light may be a strobe light nested in a reflector and may include filters for modifying the color of the auxiliary light. The filters may be mounted on a color wheel for easy selection. The means for providing auxiliary light may also be made to be triggered for a period of time during the opening of the camera shutter. Such triggering may be from the light of a light source external to the invention such as a strobe light for illuminating the subject. The means for providing auxiliary light may also include a means for varying the intensity of the auxiliary light and a means for substantially preventing auxiliary light from directly reaching the subject and the camera lens.

The obstructing means and the directing means may be housed in an opaque housing member which acts to direct the pattern of auxiliary light to the obstructing means by reflecting off reflective inner walls. This opaque housing member may also house a means for changing the position of the negative vignetter in relation to the camera lens and the means for providing auxiliary light.

The method of the present invention is for use with a camera including a lens and a subject for providing positive vignetting comprising the steps of partially blocking subject light from the camera lens in a region of the camera lens to be positive vignetted; and, introducing auxiliary light to the region to be positive vignetted. The steps of partially blocking subject light from the camera lens in a region of the camera lens to be positive vignetted and introducing auxiliary light to the region to be positive vignetted may further include partially blocking subject light from the camera lens in peripheral regions surrounding the subject and introducing auxiliary light to the peripheral regions. The steps of partially blocking subject light from the camera lens in regions of the camera lens to be positive vignetted and introducing auxiliary light to the region to be positive vignetted may further include partially blocking subject light from lower regions of the camera lens and introducing auxiliary light to the lower regions of the resulting photograph.

It is readily apparent that negative vignetting, in modifying light received from the subject, has succeeded in darkening the areas of the vignetting effect on the finished photograph. This happens because negative vignetting seeks to diffuse or eliminate subject light received by the camera in the vignetting areas. It is equally clear that the positive vignetting of the present invention adds the unique advantage of being able to lighten the vignetting areas above the level of light received by the subject. Therefore, the present invention, coupled with the numerous colors and vignetting patterns available, provides an apparatus and method for creating a distinctive and original artistic media which has not previously been available.

BRIEF DESCRIPTION OF THE DRAWINGS

FIG. 4 is a simplified perspective view of the apparatus of the present invention, with portions broken away for clarity.

FIG. 6 is a front elevational view of the color wheel, wheel housing and attached filters.

FIG. 6a is a vertical sectional view of the color wheel of FIG. 6 taken along line 6a—6a of FIG. 6.

FIG. 9 is a vertical sectional view of the apparatus of FIG. 4 taken along line 9—9 of FIG. 4.

FIG. 9a is a side view of the negative vignetter and its wedge position adjusting member of this invention.

DETAILED DESCRIPTION OF THE INVENTION

Figures 1, 2:
FIG. 1 is a simplified showing of a finished photograph using negative vignetting and showing a dark grey vignetting area.
FIG. 2 is a simplified showing of a finished photograph using positive vignetting and showing a lightened vignetting area.

Inventions of the prior art of photographic vignetting have all involved modifying only subject light received by a camera. This process is termed negative vignetting by the applicant. The modification of subject light in negative vignetting involves either the diffusion or elimination of subject light from a desired vignetting area 10 on the finished photograph 11 of FIG. 1. Therefore, negative vignetting has only been able to create vignetting areas 10 on the finished photograph 11 which are darker than the area 10 would have been with unobstructed subject light.

This limitation on the artistic medium of photographic vignetting is eliminated by the present invention which is an apparatus and method for what the applicant calls positive vignetting. The positive vignetting of the present invention allows for a full range of lighting intensity and various colors in the vignetting area 12 of the finished photograph 14 of FIG. 2. This range is from complete darkness to complete exposure of the photographic film and includes a situation in which the light from the subject appearing within the vignetting area 12 of the finished photograph 14 and an auxiliary light appearing in the vignetting area are both visible on the finished photograph 14.

Figure 3:
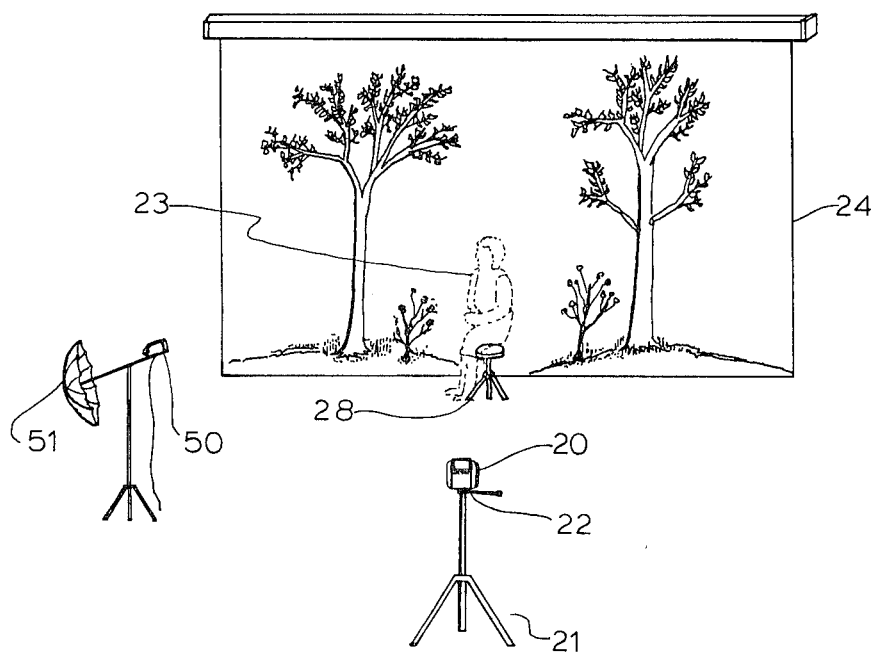
FIG. 3 is a diagram of the apparatus and method of the present invention in a typical portrait setting.

Referring to FIG. 3, the apparatus 20 of the present invention is shown in a typical portrait setting. The apparatus 20 is typically attached to a camera 22 which is set upon a tripod 21 adjusted to a desired level commensurate with the height of the desired portion of a subject 23 who normally sits on a seat 28. Behind the subject 23, there is typically a background 24 of some artistic design to aid in the artistic effect of the portrait setting. There may be one or more strobe or flood lights 50 for illuminating the subject 23 and the strobe lights 50 may have umbrella type reflectors 51 attached.

Referring to FIG. 4, the apparatus 20 typically comprises an enclosure 16 made from black anodized sheet aluminum. However, not all of the enclosure 16 will be black in color as will be discussed later. In the enclosure 16, there is first a front piece 87 which typically has a semi-circular shape for shielding out light from below the subject 23 shown in FIG. 3. Subject light is all light entering the square opening 88 and reaching the camera 22 shown in FIG. 5.

Next, the enclosure 16 typically contains a negative vignetter 27 shown in FIG. 4 as a sawtooth type. However, the negative vignetter 27 may be of any of the numerous types available including and of the infinite possible artistic shapes. The negative vignetter 27 shown in FIG. 3 is typically constructed of black anodized aluminum sheet. Behind the negative vignetter 27, the apparatus 20 typically has a color wheel 72 which is seen jutting out of the top of the enclosure 16. The color wheel 72 is typically constructed of black anodized aluminum and contains filters 70. The color wheel is rotatable so that the filters 70 may be selected as will be discussed later.

Figure 5:
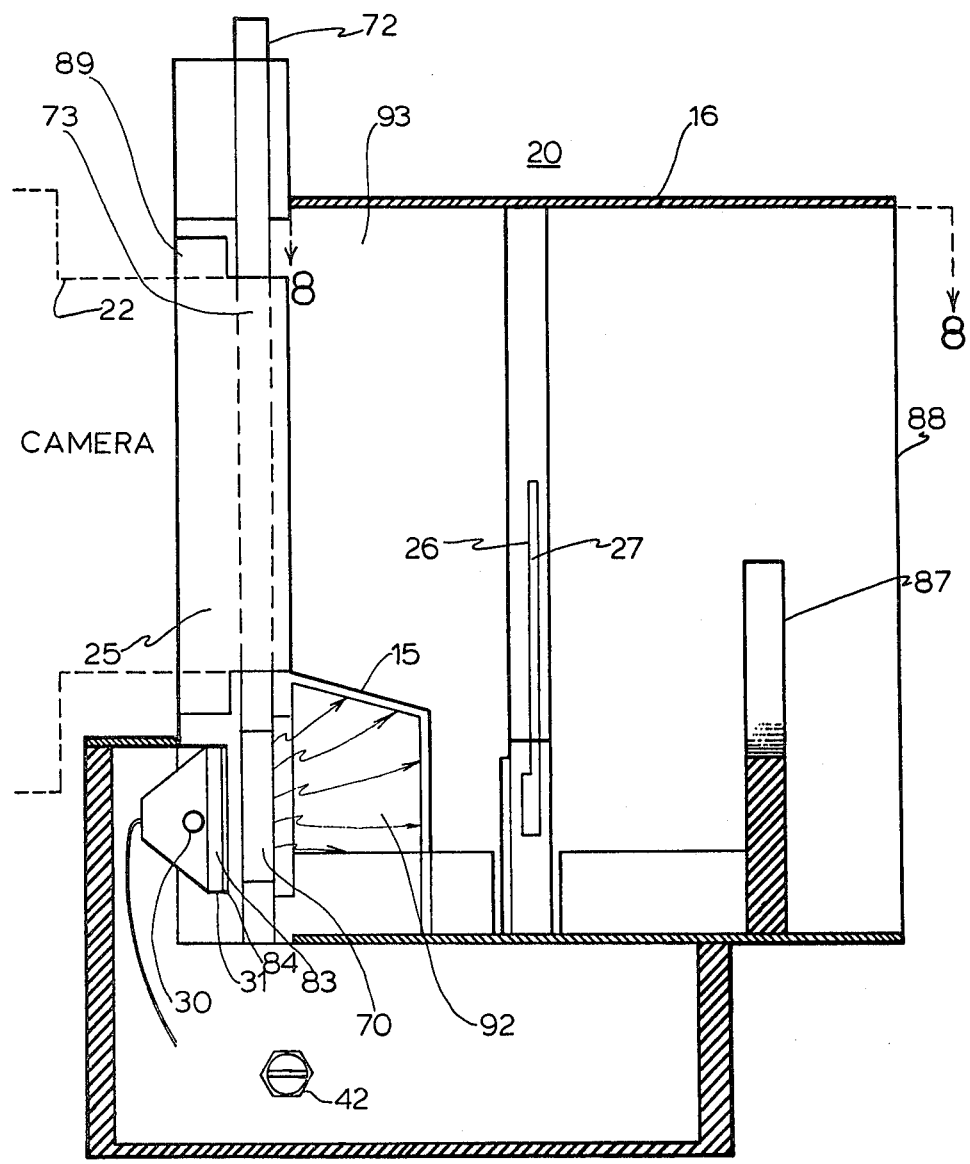
FIG. 5 is a vertical sectional view of the apparatus of FIG. 4 taken along line 5—5 of FIG. 4.

FIG. 5 is a vertical sectional view of FIG. 4 along line 5—5, viewed in the direction of the arrows. Starting from the right hand side of the enclosure 16, the front piece 87, which is typically constructed from black anodized sheet aluminum, can be seen. The front piece 87 acts as a shield against subject light received from regions below desired regions of the subject 23 seen in FIG. 3. Next is the negative vignetter 27 which reflects auxiliary light typically from a strobe lamp 30 nested inside a reflector 31 aimed at the negative vignetter 27. To prevent light from reaching the camera lens 25, a hood member 15 is interposed between the strobe lamp 30 and the negative vignetter 27. The hood member 15 typically consists of black anodized sheet aluminum painted white and generally extends for the length of the circumference of the aperature 73 (as specifically shown in FIG. 8) in the color wheel 72 so that auxiliary light from the strobe lamp 30 will not directly reach the camera lens 25.

The auxiliary light from the strobe lamp 30 typically passes through a window 83 which may be a diffusing piece of plastic or glass. Typically a neutral density filter 84 is placed over the window 83 to adjust the intensity of the auxiliary light passing through the window 83. The neutral density filter 84 typically used is a 0.20 neutral density gelatin filter.

Figure 8:
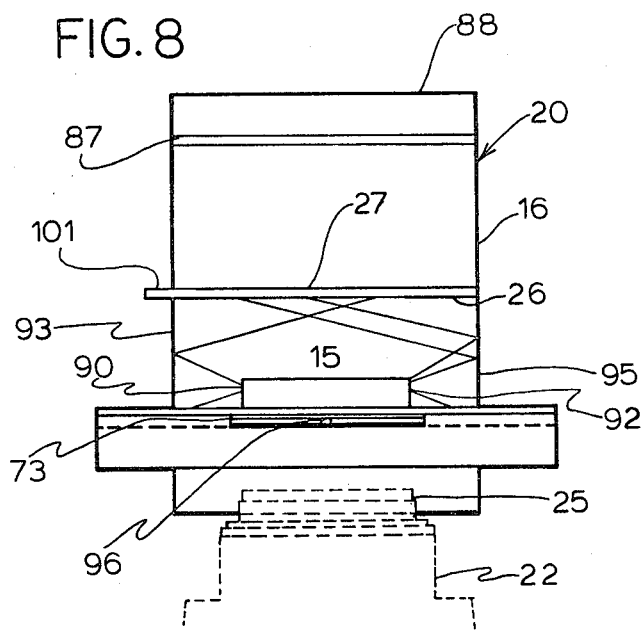
FIG. 8 is a cut-away top view of the apparatus of the present invention as shown in FIG. 5, taken along lines 8—8 of FIG. 5, showing the direction of light coming out the hood member.

Next, the auxiliary light passes through one of the selectable filters 70, and is either restricted to a desired color, not restricted at all as through a clear glass filter 89 (shown in FIG. 6), or is completely blocked by the an area 78 of the body of the color wheel 72 as shown in FIG. 6. The auxiliary light escaping from the filter 70 is then reflected off the hood member 15 until it escapes through the open sides 90 and 92 and strikes the reflective inner walls 93 and 95 of the enclosure 16 as shown in FIG. 8. Reflections from the reflective inner walls 93 and 95 strike a reflective wall 26 of the negative vignetter 27 and are, in turn, reflected to the camera lens 25. The reflections from the reflective wall 26 of the negative vignetter 27 set up the pattern of positive vignetting on the vignetting areas 12 of the finished photograph 14 shown before in FIG. 2.

Referring now to FIGS. 6 and 6a, the color wheel 72 typically consists of black anodized sheet aluminum which has incorporated therein several filters 70. These filters 70 may be of any of the numerous colors available including clear glass 89 for allowing auxiliary light of all frequencies to pass. There may also be an area 78 in the color wheel 72 which is opaque so that light from the strobe lamp 30 will not reach the negative vignetter 27 both shown in FIG. 5.

The color wheel 72 may be rotatably mounted in a wheel housing 91 also made of black anodized sheet aluminum. To allow subject and auxiliary light to pass to the camera lens 25, shown in FIG. 5, the color wheel 72 has an aperature 73 which is typically circular in area. FIG. 6a is a vertical sectional view of FIG. 6 along line 6a—6a and shows the filters 70 incorporated into the color wheel 72 and the aperature 74 in the wheel housing 91 which is typically coincident with the aperature 73 of the color wheel 72. FIG. 6a also shows clearly that the color wheel 72 extends past the wheel housing 91 at the top 75 of the wheel housing 91 so that the color wheel 72 may be rotated manually to select the desired filter 70.

The color wheel 72 may also have color dots 71 which indicate which of the filters 70 are in position in front of the strobe lamp 30 of FIG. 5. The color wheel 72 may also provide a latch pin 77 and spring assembly 79 which is incorporated into the body of the wheel housing 91. The latch pin 77 and spring assembly 79 would follow the edge 81 of the color wheel 72 until the latch pin 77 catches a dimple 96 in the edge 81 of the color wheel 72 and stops the rotation of the color wheel 72. The dimples 96 would be located such that each dimple 96 will catch the latch pin 77 when a filter 70 is in its proper position in front of the strobe lamp 30 shown in FIG. 5. Therefore, the color wheel 72 may be rotated to the desired filter 70 by noting the color of the color dot 71 and by noting the catching of the latch pin 77.

Figure 7:
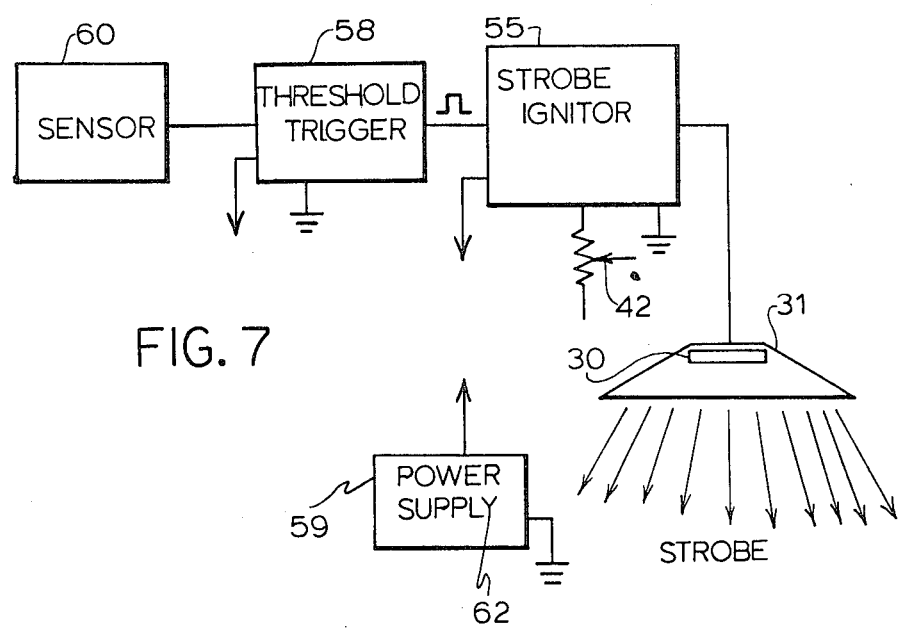
FIG. 7 is an electrical block diagram of the means for providing auxiliary light.

Referring to FIG. 7, the strobe lamp 30, which is nested inside the reflector 31, is controlled by a strobe ignitor circuit 55. The strobe ignitor circuit 55 typically sets up a strobe lamp 30 pulse period at one one thousandth of a second and allows adjustment of the strobe intensity with potientiometer 42. The strobe ignitor circuit 55 should turn on the strobe lamp 30 during the opening of the camera shutter which is not shown. To do this, the strobe ignitor circuit 55 may be triggered by a threshold trigger circuit 58 which senses an ambient light level from a photocell 60 mounted on the outside of the enclosure 16 as shown in FIG. 4. The threshold trigger circuit 58 is typically set such that when a level of light above a preset ambient level is sensed, it sends a trigger pulse to the strobe ignitor circuit 55.

The level of light above the preset ambient level can be caused by the strobe light 50 of FIG. 3 which is used to illuminate the subject 23. This strobe light 50 is triggered by the camera 22 during the period of the opening of the camera shutter not shown; and, thus, when the camera 22 triggers the strobe light 23, it also triggers the strobe lamp 30 of FIG. 5 during the opening of the camera shutter. The strobe ignitor circuit 55 may also be triggered directly from the camera 22, shown in FIG. 5, in the same way that the camera 22 triggers the strobe light 50 of FIG. 3.

The threshold trigger circuit 58 and the strobe ignitor circuit 55 are powered by a power supply 59 which may be a battery supply or an AC line current adaptor for supplying the necessary power requirements. Also, the photocell 60, threshold trigger circuit 58 and the strobe ignitor circuit 55 may be a photographic slave unit which are commonly available. However, it has been found that a slave unit manufactured by Sunpak, Model #651-715, has been found to operate satisfactorily with the present invention.

Referring to FIG. 8, subject light enters the enclosure at the square aperature 88, is partially blocked by the front piece 87 and the negative vignetter 27, passes through aperature 73 in the color wheel 72 and the aperature 74 in the wheel housing 91, and then reaches the camera lens 25. In addition, the auxiliary light escapes from the two openings 90 and 92 in the hood member 15 and reflects off the two reflective inner walls 93 and 95 of the enclosure 16. The reflections from the reflective inner walls 93 and 95 then strike the reflective wall 26 of the negative vignetter 27. Some of the auxiliary light reflected from the reflective wall 26 will reach the camera lens 25 through aperature 73 in the color wheel 72 and through aperature 74 in the wheel housing 91. Thus, both subject light and auxiliary light in a pattern dictated by the shape and nature of the negative vignetter 27 appear on the finished photograph 14 of FIG. 2.

Referring to FIGS. 9 and 9b, the vertical position of the negative vignetter 27 may be adjusted within the enclosure 16. The negative vignetter 27 is typically guillotine shaped with a lower edge 86 bent at approximately 90 degrees from the reflective wall 26 of the negative vignetter 27 as can be seen in FIG. 9a. The negative vignetter 27 is vertically moved within the enclosure 16 in channels 97 and 98 in the enclosure 16. The negative vignetter 27 is stabilized in channels 97 and 98 by a pin 99 adjacent the reflective wall 26 of the negative vignetter 27. The negative vignetter 27 is raised or lowered vertically within the channels 97 and 98 by a wedge member 100 which is forced against the lower edge 86 by a handle 101 to raise the negative vignetter 27 and pulled away from the lower edge 86 to lower the negative vignetter 27. The wedge member 100 is stabilized within the enclosure 16 by a lip portion 102 hugging a bulkhead portion 18 of the enclosure 16 to assure that the wedge member 100 travels in line with the lower edge 86 of the negative vignetter 27.

The artistic effects of positive vignetting may be varied by adjusting a number of criteria of the apparatus 20. First, the negative vignetter 27 may be raised or lowered vertically in the enclosure 16 by a handle 101 connected to the wedge member 100 as just discussed. This will raise or lower the vignetting areas 12 relative to the subject 23 on the finished photograph 14, shown in FIG. 2. The negative vignetter 27 may also be changed to a different shape or type, thereby changing the artistic effect by changing the pattern of auxiliary light reflected from the reflective wall 26 of the negative vignetter 27.

The intensity of the strobe lamp 30 may be adjusted by a potientiometer 42 of the strobe ignitor circuit 55 shown in FIG. 7 or by the use of the neutral density filter 84. The more intense the auxiliary light, the more lightened the vignetting areas 12 of the finished photograph 14, shown in FIG. 2, will be. In addition, a filter 70 may change the color of the auxiliary light from the strobe lamp 30; thus, changing the color of the vignetting areas 12 of the finished photograph 14. As well, the shutter speed of the camera 22 shown in FIG. 3 can be adjusted. Therefore, it can readily be seen that the apparatus 20 of the present invention allows for infinite variations in the artistic effects of positive vignetting.

The method of the present invention is for use with a camera including a lens and a subject for providing positive vignetting comprising the steps of partially blocking subject light from the camera lens in a region of the camera lens to be positive vignetted; and, introducing auxiliary light to the region to be positive vignetted. The steps of partially blocking subject light from the camera lens in a region of the camera lens to be positive vignetted and introducing auxiliary light to the region to be positive vignetted may further include partially blocking subject light from the camera lens in peripheral regions surrounding the subject and introducing auxiliary light to the peripheral regions. The steps of partially blocking subject light from the camera lens in regions of the camera lens to be positive vignetted and introducing auxiliary light to the region to be positive vignetted may further include partially blocking subject light from lower regions of the camera lens and introducing auxiliary light to the lower regions.

Therefore, it can be seen that the method of the present invention also achieves the objective of the present invention which is the elimination of the limitations of negative vignetting by providing a method of positive vignetting.

The above described embodiments of this invention are merely descriptive of its principles and are not to be considered limiting. The scope of this invention instead shall be determined from the scope of the following claims, including their equivalents.

We claim:

1. A positive vignetting apparatus for positioning between a camera lens and a subject to be photographed to allow the addition of lighting to the peripheral region of a photographic image of the subject without interference with the central subject region thereof comprising:

a housing for positioning between the lens of a camera and the subject to be photographed;
   said housing including a direct optical path therethrough between the subject and the lens of the camera with which the apparatus is associated, said optical path being free of optical elements in the region of the optical path directed at the subject;
   vignetting means for partially obstructing a portion of the direct optical path between the subject and the lens of said camera;
   an auxiliary light source contained within said housing and positioned between said vignetting means and the lens of said camera;
   means shielding the lens of the camera from direct exposure to said auxiliary light source;
   said auxiliary light source being operative to illuminate the face of said vignetting means on the side thereof exposed to the lens of said camera;
   whereby said lens is illuminated directly by light from said subject without intervening optical elements in a portion of the optical path between the subject and the camera lens is illuminated indirectly at peripheral regions of the optical path to provide positive vignetting of the peripheral regions thereof.

2. The combination in accordance with claim 1 wherein said auxiliary light source comprises a strobe lamp and triggering means therefore responsive to increased ambient light in the region of the camera to energize said strobe light synchronized with the increase in ambient light on the subject.

3. The combination in accordance with claim 1 including selectable filters within said housing in the light path from said auxiliary light source to the camera lens whereby the color of the auxiliary light may be changed without affecting the color properties of the direct path between the subject and the camera lens.

4. The combination in accordance with claim 3 wherein said selectable filters are mounted on a color filter wheel which is rotatable by the operator to place different filters in the auxiliary light path to provide different colors of positive vignetting.

* * * * *